United States Patent Office 2,720,481
Patented Oct. 11, 1955

2,720,481

BISULFITE ADDITION PRODUCTS OF ALDEHYDE DERIVATIVES OF CORTISONE AND HYDROCORTISONE

William J. Leanza, Staten Island, N. Y., and Edward F. Rogers, Rome, Italy, assignors to Merck & Co., Inc., Rahway, N. J., a corporation of New Jersey No Drawing. Application November 24, 1952,
Serial No. 322,357

11 Claims. (Cl. 167—65)

This invention relates to pregnene compounds and more particularly to novel alkali metal and alkaline earth metal bisulfite addition products of cortisone-21-aldehyde and hydrocortisone-21-aldehyde, and processes of preparing these compounds.

The hormones, $\Delta^4$-3,11,20-triketo-17$\alpha$,21-dihydroxypregnene, commonly called cortisone, and $\Delta^4$-3,20-diketo-11$\beta$,17$\alpha$-21-trihydroxypregnene, commonly called hydrocortisone, have been found to possess useful therapeutic properties which are now well known. Unfortunately, however, all of the known compounds possessing cortisone-like activity are essentially insoluble in water. Thus, cortisone, hydrocortisone, and their esters, as well as the various related compounds, such as cortisone-21-aldehyde and hydrocortisone 21-aldehyde, are all practically insoluble in water. Because of the insoluble nature of these compounds, it is necessary to administer them by the oral route formulated with suitable carriers into tablets and capsules, or by the intramuscular route as an aqueous suspension. While these methods have produced excellent results in the treatment of many diseases, such as arthritis, they are not satisfactory for all conditions requiring administration of cortisone-like compounds. Thus, intramuscular injection is only partially effective when rapid assimilation of the hormones by the body is necessary for effective treatment. In addition, prescription by the oral route is prohibited, or made impractical, by the very nature of some disorders which require these hormones in their treatment. It therefore becomes necessary to administer the hormones intravenously to achieve a rapid effect. However, it is generally considered undesirable to inject an aqueous suspension of an insoluble product into the blood stream because of the possibility of injecting particles of too large a size. In addition, the variable concentration caused by settling of the suspended particles renders the injection of an accurate dosage difficult.

Therefore, one object of this invention is to provide new and novel water soluble compounds which have cortisone-like activity. A further object is to provide new and novel parenteral solutions for use in cortisone therapy.

In accordance with the present invention, it is now found that the novel alkali metal and alkaline earth metal bisulfite addition products of $\Delta^4$-3,11,20-triketo-17$\alpha$-hydroxy pregnene-21-aldehyde, commonly called cortisone-21-aldehyde and $\Delta^4$-3,20-diketo-11$\beta$,17$\alpha$-dihydroxy pregnene-21-aldehyde, commonly called hydrocortisone-21-aldehyde, are valuable water soluble compounds possessing cortisone-like activity and are particularly suitable for therapeutic use either by oral administration or by injection. These compounds, in which the bisulfite salt is believed to be bound to the 21-aldehyde substituent, are obtained by reacting cortisone-21-aldehyde or hydrocortisone-21-aldehyde with an alkali metal or an alkaline earth metal bisulfite salt. The cortisone-21-aldehyde and hydrocortisone-21-aldehyde employed as starting materials in our process may be prepared as described in J. Am. Chem. Soc., 74, 2947 (1952).

The novel products of our invention are most conveniently prepared by reacting the aldehyde with an aqueous solution of an alkali metal or an alkaline earth metal bisulfite salt. This reaction is preferably effected by reacting a solution of the aldehyde, or the monohydrate salt thereof, in a neutral organic solvent with an aqueous solution of an alkali metal or an alkaline earth metal bisulfite salt. Although various neutral organic solvents including those which are not miscible with water may be used for dissolving the aldehyde, we usually prefer to employ a water miscible solvent such as a lower alcohol, acetone, dioxane, and the like, for this purpose. The reaction proceeds readily at room temperature and is aided by stirring the mixture. Although the quantities of reactants employed is not critical, and an excess of either reactant may be employed, we usually prefer to use an equivalent amount of each reactant for the obtainment of maximum yields.

The resulting bisulfite addition product can be isolated from the reaction mixture in accordance with conventional procedures. For example, the organic solvent may be removed by distillation and the water evaporated or, the solvent may be removed and the aqueous solution freeze dried. If highly concentrated solutions of the reactants are employed, the bisulfite addition product precipitates from the reaction mixture and may be recovered by direct filtration. If desired, the product may be recrystallized from an organic solvent or a solvent-water mixture. Ethanol has been found satisfactory for this purpose.

The alkaline earth metal bisulfite addition products of cortisone-21-aldehyde and hydrocortisone-21-aldehyde can be prepared either by reacting the aldehyde with the bisulfite salt directly or alternatively, by metathetically reacting an alkali metal bisulfite addition product of the aldehyde with an alkaline earth metal salt in an aqueous medium.

In accordance with a further embodiment of our invention, novel compositions suitable for the administration of the new bisulfite addition compounds are obtained by incorporating these products with a suitable sterile parenteral liquid such as water. Since the novel bisulfite addition products are 7 to 180 times more soluble in water than the compounds having cortisone-like activity heretofore known, these compounds are eminently well suited for the preparation of aqueous solutions.

The remarkable and unexpectedly high water solubility of the novel bisulfite compounds is readily shown in Table I in which the water solubility of these compounds is compared with that of known compounds having cortisone-like activity.

TABLE I

| Compound | Percentage Solubility in Water at Room Temperature |
|---|---|
| 1. Cortisone | 0.028 |
| 2. Cortisone-21-acetate | 0.0022 |
| 3. Cortisone-21-aldehyde monohydrate | 0.066 |
| 4. Sodium cortisone-21-aldehyde bisulfite | 12.0 |
| 5. Potassium cortisone-21-aldehyde bisulfite | 0.5 |
| 6. Magnesium cortisone-21-aldehyde bisulfite | 4.0 |
| 7. Calcium cortisone-21-aldehyde bisulfite | 2.0 |
| 8. Hydrocortisone | 0.028 |
| 9. Hydrocortisone-21-acetate | 0.001 |
| 10. Hydrocortisone-21-aldehyde monohydrate | 0.024 |
| 11. Sodium hydrocortisone-21-aldehyde bisulfite | 7.0 |

The alkali metal and alkaline earth metal bisulfite addition products of cortisone-21-aldehyde and hydrocortisone-21-aldehyde are systemically active. For example, when these novel products are dissolved in water and the resulting solution is administered to rats subcutaneously the observed systemic activity as measured by the liver glycogen deposition test is about equal to the corresponding aldehydes. The activity possessed by the sodium bisulfite addition product of cortisone-21-aldehyde when compared to the highly active parent compound cortisone-21-aldehyde is representative of these novel compounds. These two compounds were tested for activity in a routine test used for this purpose. In this test three groups of 6 rats each were fasted 48 hours. A quantity of the hormone to be tested equivalent to 1.5 mg. per 100 g. rat of cortisone-21-aldehyde monohydrate was administered in water to each rat in a group in five hourly injections of approximately equal volume. One hour after the fifth and last injection the rats were sacrificed and the glycogen deposition in the liver determined. The following results were obtained which show that the new and novel water soluble forms are as active as the parent compounds.

TABLE II

| Compound | Liver Glycogen mg./100 g. rat |
| --- | --- |
| None | 32.1 |
| Cortisone-21-aldehyde | 58.0 |
| Sodium cortisone-21-aldehyde bisulfite | 58.3 |

Example I

SODIUM CORTISONE-21-ALDEHYDE BISULFITE

To a solution of 2.25 g. of cortisone-21-aldehyde monohydrate in 50 ml. of methanol was added a solution of 662 mg. of sodium bisulfite in 50 ml. of water. The solvents were removed from the reaction mixture by distillation under diminished pressure at room temperature. The residue was dissolved in 200 ml. of boiling absolute ethanol and filtered. The filtrate was concentrated by partial evaporation, cooled, and the resulting white crystals of the sodium bisulfite addition product of cortisone-21-aldehyde recovered by filtration.

The compound is hygroscopic and absorbs 1 to 2 moles of water upon standing. A sample of the product was dried at 60° C. for 2 hours to produce an anhydrous product. It melted at 191–192° C. with decomposition.

The optical rotation was $[\alpha]_D^{24} + 170°$ (2.0% in $H_2O$). The ultraviolet absorption spectrum had a maxima at 2450 Å, E%=354, in water.

*Analysis.*—Calcd. for $C_{21}H_{27}O_8SNa$: C, 54.53; H, 5.89; Na, 4.97. Found: C, 54.64; H, 5.85; Na, 4.80.

The solubility of the anhydrous sodium bisulfite addition product was determined to be greater than 12% in water at 23° C. or over 180 times more soluble than cortisone-21-aldehyde in water.

Example II

POTASSIUM CORTISONE-21-ALDEHYDE BISULFITE 2.26 g. of cortisone-21-aldehyde monohydrate was dissolved in 30 ml. of methanol and the solution combined with a solution of 0.8 gm. of potassium metabisulfite in 60 ml. of water. The reaction mixture was distilled to remove the methanol and then evaporated to 30 ml. A white precipitate of the potassium bisulfite addition product of cortisone-21-aldehyde was produced and recovered by filtration. After air drying the product weighed 2.7 g. and had a melting point of about 240° C. (dec.). A portion of the product was recrystallized by dissolving it in boiling water and concentrating to a small volume followed by cooling. The recrystallized sample melted at 237–240° C. (Dec.). The recrystallized product was dried at 100° C. under reduced pressure.

The optical rotation was $[\alpha]_D^{24} + 165°$ (0.4% in $H_2O$). The ultraviolet absorption spectrum had a maxima at 2450 Å, E%=349, in water.

*Analysis.*—Calcd. for $C_{21}H_{27}O_8SK$: C, 52.70; H, 5.69; K, 8.17. Found: C, 53.13; H, 5.33; K, 7.87.

The product was determined to have a solubility of 0.5% in water which is 7 times greater than the solubility of cortisone-21-aldehyde.

Example III

SODIUM HYDROCORTISONE-21-ALDEHYDE BISULFITE

One gram of hydrocortisone-21-aldehyde was dissolved in methanol and treated with 30 ml. of an aqueous 1% sodium bisulfite solution. The reaction mixture was concentrated to 2 ml. and extracted into 250 ml. of ethanol. The alcoholic solution was filtered and concentrated to 75 ml., filtered, and allowed to cool slowly. The crystals of the sodium bisulfite addition product of hydrocortisone-21-aldehyde, which crystallized from solution as a hydrate, were collected and found to have a melting point of 192–196° C. The crystals were dissolved in ethanol and the product which crystallized upon cooling found to melt at 191–192° C. The product was over 7% soluble in water.

The ultraviolet absorption spectrum was found to have a maxima at 2420 Å, E%=318, in methanol.

*Analysis.*—Calcd. for $C_{21}H_{29}O_8SNa \cdot H_2O$: C, 52.1; H, 6.45; Na, 4.78; Found: C, 51.1; H, 6.15; Na, 5.36.

In a manner similar to the procedure described in this example the potassium bisulfite addition product of hydrocortisone-21-aldehyde is prepared by reacting a water-miscible organic solvent solution of hydrocortisone-21-aldehyde with a dilute solution of potassium metabisulfite in water followed by recovery of the desired product.

Example IV

MAGNESIUM CORTISONE-21-ALDEHYDE BISULFITE

To 200 ml. of water saturated with $SO_2$ gas was added 1.2 gm. of magnesium oxide to form a solution of magnesium bisulfite. 13 ml. of the magnesium bisulfite solution was added to 0.47 gm. of cortisone-21-aldehyde monohydrate in 20 ml. of methanol. The methanol was removed by evaporation and then the water removed at room temperature under reduced pressure. The resulting magnesium cortisone-21-aldehyde bisulfite addition compound was found to be 4% soluble in water.

By this procedure magnesium hydrocortisone-21-aldehyde bisulfite may be prepared.

Example V

CALCIUM CORTISONE-21-ALDEHYDE BISULFITE 1.0 gm. of calcium carbonate was dissolved in 200 ml. of water saturated with $SO_2$ gas. 13 ml. of the aqueous solution of calcium bisulfite was added to 0.47 gm. of cortisone-21-aldehyde monohydrate in 20 ml. of methanol. The methanol was removed by evaporation and a white precipitate of calcium cortisone-21-aldehyde bisulfite formed which was recovered by filtration. The compound sintered at 185° C. and decomposed at 225° C. It was about 2% soluble in water.

The calcium cortisone-21-aldehyde bisulfite addition compound may also be prepared by a metathesis reaction of which the following is representative:

Approximately 0.5 gm. of sodium cortisone-21-aldehyde bisulfite was dissolved in 5 ml. of water and added to 0.5 gm. of calcium chloride in 3 ml. of water. The calcium bisulfite addition product of cortisone-21-aldehyde precipitated immediately and was recovered by filtration.

The calcium and other alkaline earth metal bisulfite salts of hydrocortisone-21-aldehyde can be prepared by use of these procedures.

What is claimed is:

1. A pregnene addition product selected from the class consisting of alkali metal and alkaline earth metal bisulfite addition products of cortisone-21-aldehyde and hydrocortisone-21-aldehyde.

2. An alkali metal bisulfite addition product of cortisone-21-aldehyde.

3. An alkali metal bisulfite addition product of hydrocortisone-21-aldehyde.

4. An alkaline earth metal bisulfite addition product of cortisone-21-aldehyde.

5. An alkaline earth metal bisulfite addition product of hydrocortisone-21-aldehyde.

6. The sodium bisulfite addition product of cortisone-21-aldehyde.

7. The magnesium bisulfite addition product of cortisone-21-aldehyde.

8. The sodium bisulfite addition product of hydrocortisone-21-aldehyde.

9. The process which comprises reacting a pregnene aldehyde selected from the class consisting of cortisone-21-aldehyde and hydrocortisone-21-aldehyde with a metal bisulfite selected from the class consisting of alkali metal and alkaline earth metal bisulfites to produce the corresponding metal bisulfite addition product of the pregnene aldehyde.

10. A parenteral solution for use in cortisone therapy comprising a pregnene addition product selected from the class consisting of alkali metal and alkaline earth metal bisulfite addition products of cortisone-21-aldehyde and hydrocortisone-21-aldehyde, and a sterile parenteral liquid.

11. A parenteral solution for use in cortisone therapy comprising a pregnene addition product selected from the class consisting of alkali metal and alkaline earth metal bisulfite addition products of cortisone-21-aldehyde and hydrocortisone-21-aldehyde, and water.

References Cited in the file of this patent

UNITED STATES PATENTS

| | | |
|---|---|---|
| 2,188,914 | Miescher | Feb. 6, 1940 |
| 2,554,986 | Heyl | May 29, 1951 |

OTHER REFERENCES

Rogers et al.: Jour. Am. Chem. Soc. 74, 2947 (1952).
Fieser et al.: Organic Chemistry, 2d Ed., p. 203 (1950).